Oct. 28, 1941.   T. R. HARRISON   2,261,083
CONTROL APPARATUS
Filed Dec. 9, 1937

INVENTOR.
THOMAS R. HARRISON
BY *George W. Mumulough*
ATTORNEYS.

Patented Oct. 28, 1941

2,261,083

UNITED STATES PATENT OFFICE 2,261,083

CONTROL APPARATUS

Thomas R. Harrison, Wyncote, Pa., assignor to The Brown Instrument Company, Philadelphia, Pa., a corporation of Pennsylvania Application December 9, 1937, Serial No. 178,898

4 Claims. (Cl. 172—278)

The present invention relates to sensitive control devices of the type which create control effects in response to slight changes in a variable condition, and more particularly to sensitive control devices of the type which are responsive to changes in a variable condition and utilize reversible electrical motors for effecting the controlling adjustments.

A specific object of the invention is to provide a sensitive control device for selectively controlling the rotation and direction of rotation of reversible electrical motors in which physically moving relays or switches are not required nor employed.

A more specific object of the invention is to provide a sensitive control device which is responsive to changes in the magnitude of current flow in an electrical circuit and is adapted upon changes in said current flow from a predetermined value to selectively control the rotation and direction of rotation of a reversible electrical motor without employing physically moving relays or switches.

In accordance with the present invention slight changes from a predetermined value in a variable condition under control are transformed into corresponding changes from a predetermined value in the flow of current in an electrical circuit which may be amplified and the amplified current is employed directly without the use of relays having mechanically moving parts to selectively control the actuation of a reversible electrical motor for rotation in one direction or the other or to cause it to assume a position of rest depending upon whether the magnitude of the original current is above or below said predetermined value or is that value, respectively. As will be clearly apparent, the reversible motor may be employed for effecting control adjustments of valves, rheostats, switches or the like for restoring the condition to the desired value.

By means of my invention, variations in a condition to be controlled are detected by a sensitive device which is adapted to vary the flow of current in the input circuit of an electronic amplifier in accordance with the changes in the condition, and the amplified current is employed to control the saturation of a magnetic device, which, according to the extent to which it is saturated, is adapted to selectively cause a shift in the phase angle in either direction of alternating current flowing in a circuit. One phase winding of a reversible two phase induction motor is included in the last mentioned circuit and the other phase winding is energized directly from the alternating current supply source so that when the phase of the alternating current flowing in the first mentioned motor winding is shifted relatively to that in the second mentioned motor winding, a rotating magnetic field will be set up in one direction or the other in the motor and the latter will be actuated for rotation in a corresponding direction.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention Of the drawing:

Figure 1:
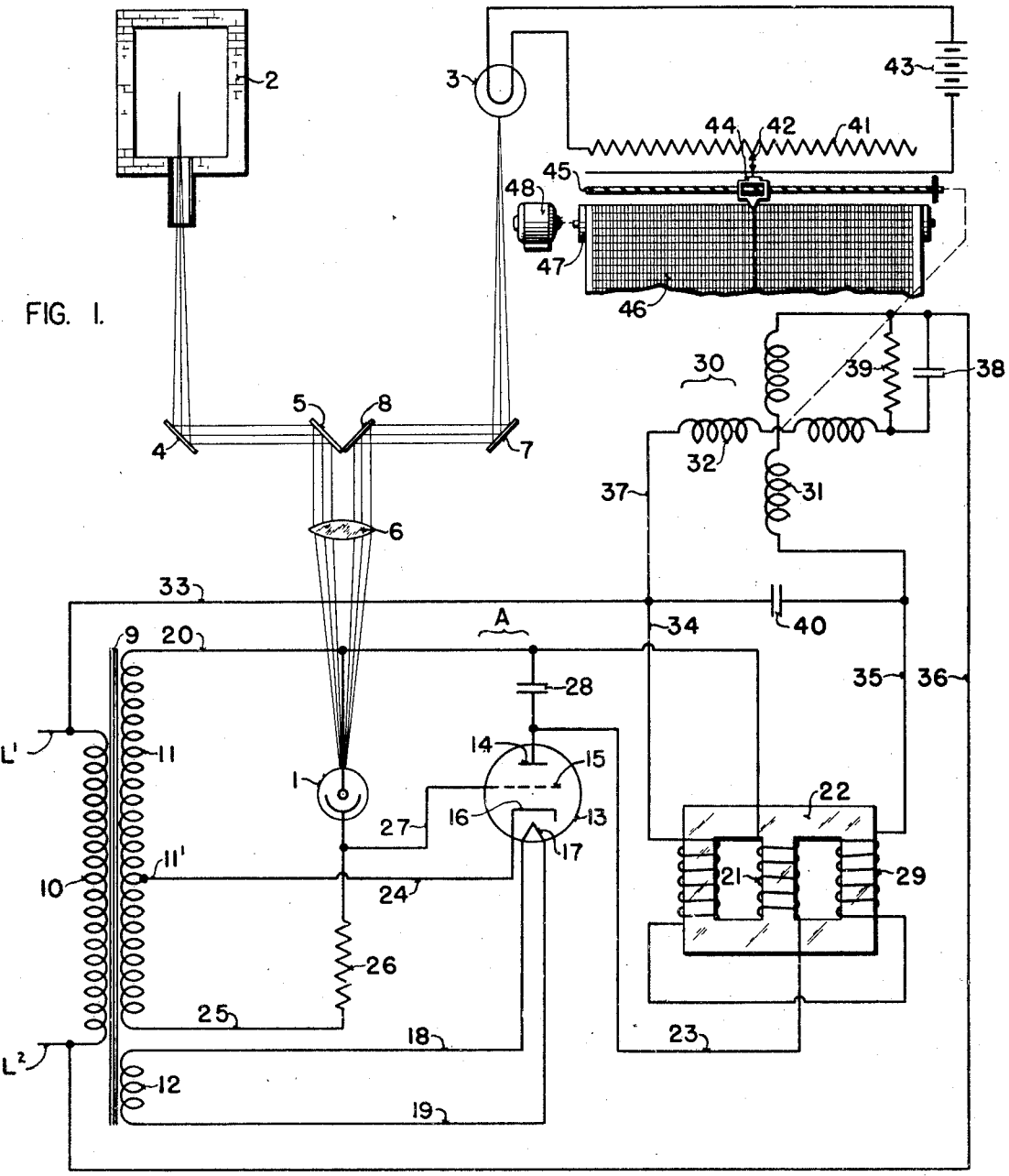
Fig. 1 is a diagrammatic view illustrating one embodiment of the invention as adapted for use in measuring and recording the temperature of an incandescent body.

In Fig. 1 of the drawing a photopyrometer is illustrated in which a photoelectric cell 1 is arranged to receive light jointly from the interior of a furnace 2 and from a lamp 3, the illumination of which is adapted to be controlled by means responsive to the illumination of the photoelectric cell 1. The photoelectric cell 1 is connected to the input circuit of an electronic amplifier A, and as the temperature of the incandescent material within the furnace varies, the output current from the amplifier operates through suitable apparatus to be described to vary the supply of energizing current to lamp 3 as required to restore the illumination on the photoelectric cell to its former value. As will be clearly apparent, the magnitude of the lamp energizing current will then be a measure of the temperature of the incandescent material in the furnace 2.

As illustrated, light from the furnace 2 is directed onto the photoelectric cell 1 by means of mirrors 4 and 5 and a converging lens 6, and light from the lamp 3 is directed onto the photoelectric cell by means of mirrors 7 and 8 and lens 6. The photoelectric cell 1 is arranged in a suitable casing, not shown, and the casing is so arranged that the only light which impinges on the cell is that from the furnace 2 and lamp 3.

As noted hereinbefore the current conducted by the photoelectric cell 1 is adapted to be amplified by the amplifier A which, as illustrated, includes a transformer 9 and an electronic valve 13. The transformer 9 is a combination step-up and step-down transformer and includes a primary winding 10 which is energized from alternating voltage supply conductors $L^1$ and $L^2$, a high voltage secondary winding 11 having a tap $11^1$ disposed near the lower end as seen in Fig. 1, and a low voltage secondary winding 12. The valve 13 is a heater type triode and includes an anode 14, a control grid 15, a cathode 16, and a heater filament 17, the latter of which is connected by conductors 18 and 19 to the terminals of the low voltage transformer secondary winding 12 and receives energizing current therefrom.

Anode voltage is supplied valve 13 from a portion of the high voltage transformer secondary winding 11 through a circuit which may be traced from the upper end of the winding to conductor 20, the direct current winding 21 of a saturating reactor 22, conductor 23, anode 14, cathode 16, and conductor 24 to the tap $11^1$ on the winding. Energizing voltage is supplied the photoelectric cell 1 from the transformer secondary winding 11 also, and this energizing circuit may be traced from the upper end of winding 11 to conductor 20, the anode of photoelectric cell 1, the cathode of the latter, and conductor 25 in which a resistor 26 is inserted to the lower end of winding 11.

The cathode of photoelectric cell 1 is connected by a conductor 27 to the control grid 15 of valve 13 and as will be noted the anode of cell 1 is connected to the anode 14 of valve 13 through the direct current winding 21 of the saturable reactor 22. Thus, the photoelectric cell 1 and valve 13 will both be conductive during the same half cycles of the alternating voltage induced in the transformer secondary winding 11, and as will be clear, the photoelectric cell will be operative to control the conductivity of valve 13 in accordance with the value of the light impinging thereon.

Bias voltage is supplied the control grid 15 of valve 13 by the portion of the transformer secondary winding 11 between the tap $11^1$ and the lower end of the winding, and in operation the value of this bias voltage is so adjusted that when the illumination on the photoelectric cell is a predetermined value, the pulsating current conducted by the valve 13 will be a desirable value. This pulsating current is passed through the direct current winding 21 of the saturating reactor 22, and in order to smooth out the pulsations a condenser 28 is connected across the terminals of the winding 21.

The saturating reactor 22 also includes an alternating current winding 29 in addition to the direct current winding 21, both of which are wound on a magnetic core, the saturation of which is controlled in accordance with the current flow through the direct current winding 21. When the direct current winding is deenergized the alternating current winding 29 presents a relatively high impedance to the flow of current therethrough, but as the current flow through the direct current winding 21 is increased, the magnetic saturation of the core is increased, and due to this action, the impedance of the alternating current winding 29 is decreased to a corresponding extent.

The alternating current winding 29 is connected in a circuit including the alternating voltage supply conductors $L^1$ and $L^2$ and one phase winding 31 of a two-phase reversible motor 30 which, as shown, also includes a phase winding 32. This circuit may be traced from the supply conductor $L^1$, conductor 33, conductor 34, the alternating current winding 29 of reactor 22, conductor 35, motor winding 31, and conductor 36 to the supply conductor $L^2$. The motor phase winding 32 receives energizing current from the supply conductors $L^1$ and $L^2$ through a circuit which may be traced from the supply conductor $L^1$, conductor 33, conductor 37, motor winding 32, a resistor 39 which may be shunted by a condenser 38 and conductor 36 to the supply conductor $L^2$. Condenser 38 and resistor 39 are desirably employed to offset the inductive effect of the motor winding 32 so that when the motor is not actuated for rotation in either direction the alternating current flow through winding 32 will be substantially in phase with the alternating current flow through winding 31. Experiments have shown, however, that condenser 38 is not absolutely necessary in some cases and that satisfactory operation may be obtained when the condenser 38 is omitted.

It will be noted a condenser 40 is connected in parallel with the alternating current winding 29 of reactor 22, and as will later be described, this condenser tends to give the current flowing through the motor winding 31 a leading characteristic relative to the alternating voltage supplied by conductors $L^1$ and $L^2$. As will be clear, the effect of the alternating current winding 29, when the impedance of the latter is a comparatively low value such as will be produced by relatively high saturation of the saturable reactor 22, is to give the current flowing through the motor winding 31 a lagging characteristic relative to the voltage of the supply conductors.

Thus, when the saturation of the reactor 22 is a certain predetermined value, the inductive effect of the alternating current winding 29 will just offset the capacitative effect of condenser 40 and the impedance of the parallel circuit comprised of these elements will be in the form of a high resistance. If the condenser 38 and resistor 39, in circuit with the motor winding 32, are properly proportioned, the current flow through both motor windings 31 and 32 will be in phase whereby the motor will not be energized for rotation in either direction, but will remain stationary. If the saturation of the magnetic core is increased or decreased, however, causing the current flow through the motor winding 31 to lag or lead the current flow through the motor winding 32, the interaction of the magnetic fields set up by the windings will set up a rotating field in one direction or the other in the motor and cause rotation of the latter in a corresponding direction.

It is noted that when the inductive effect of the alternating current winding 29 of the reactor 22 just offsets the capacitative effect of condenser 40 that the current flow through the motor winding 31 will be a minimum value. When this condition obtains the winding 29 and condenser 40 are substantially resonant, and, as is well known, the current passed by a parallel resonant circuit is a minimum or zero value. Thus, when the inductive effect of winding 29 and the capacitative effect of condenser 40 just balance, the current supplied the motor winding 31 will be substantially zero, and the motor will not be energized for rotation in either direction. As the inductive effect of the winding 29 or the capacitative effect of the condenser 40 predominate, however, alternating current displaced in the backward or forward direction with respect to the current supplied motor winding 32 will be supplied the motor winding 31 and the motor will be actuated for rotation in a corresponding direction.

It will be noted the direction of rotation of the motor is determined by the direction of phase displacement of the current supplied to the motor winding 31 whereas the speed of motor rotation will be determined by the degree to which the parallel circuit consisting of winding 29 and condenser 40 is displaced from its resonant condition.

In accordance with the present invention the reversible electrical motor 30 is employed to control the supply of energizing current to the lamp 3 so that upon variation in the temperature of the incandescent material in the furnace 2 and a resultant change in the illumination of photoelectric cell 1, the motor 30 will be energized for rotation in a corresponding direction and operates to vary the supply of energizing current to lamp 3 as required to restore the illumination of photoelectric cell 1 to its previous value. As illustrated, the means for varying the supply of energizing current to lamp 3 includes a current limiting resistor 41 having a movable contact 42 adjustable relatively to the resistor for varying the amount of resistor in circuit. Resistor 41 is connected in series with the lamp energizing terminals and the lamp energizing source, illustrated as a battery 43. Contact 42, adapted to vary the amount of resistor 41 in circuit with the lamp 3, is attached to a suitable carrier 44 which is capable of being moved along the length of resistor 41. In attaining this end the carrier 44 may be mounted on a screw shaft 45 and arranged to be moved in one direction or the other as the shaft is rotated. The shaft 45 is connected in any convenient manner to the shaft of motor 30 so that when the motor is actuated for rotation in one direction or the other, the shaft 45 will be rotated in the desired direction to vary the position of contact 42 relatively to resistor 41 and thereby the supply of energizing current to lamp 3.

As will be clearly apparent, a pen may be mounted on carrier 44 and arranged in cooperative relation with a recorder chart 46 for recording the variations in temperature of the material in furnace 2. The recorder chart 46 is arranged to be driven by a continuously rotating roller 47 and the latter is driven in any convenient manner, as for example, by a unidirectional motor 48 through suitable gearing, not shown, so that a record of the temperature of the incandescent material in the furnace 2 will be had as a continuous line on the chart 46.

Figure 2:
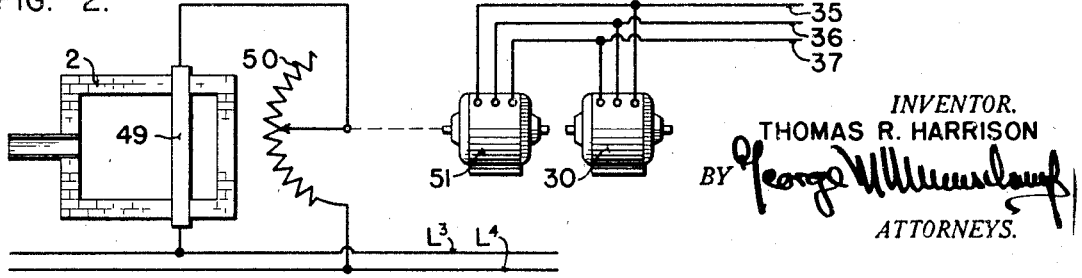
Fig. 2 is a diagrammatic representation of the use of the invention in a control system.

It will be apparent that motor 30 may be employed to operate a control valve or a rheostat for governing the application of an agent to a furnace for producing heat for example, to the furnace for producing heat for example, to the radiant energy of which the photoelectric cell 1 is responsive, or another motor desirably operated together with the motor 30 may be so employed. For example, as illustrated more or less diagrammatically in Fig. 2, a furnace 2, to the temperature of which the photoelectric cell 1 is responsive, is heated by a resistor 49 which is connected to the supply conductors $L^3$ and $L^4$ through a rheostat 50, the adjustment of which is effected by a motor 51. The motor 51 may be exactly like the motor 30 and is shown in Fig. 2 as having its terminals connected to the conductors 35, 36 and 37 in parallel with the corresponding terminals of motor 30. The mechanical connection of the rheostat 50 to the motor 51 is such as to increase and decrease the supply of electric current to the resistor 49 as the temperature of the furnace 2 drops below or rises above a predetermined level.

Subject matter disclosed in this application and not claimed is being claimed in my copending application, Serial No. 175,738, filed Nov. 20, 1937 and issued into Patent 2,219,775 on October 29, 1940.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a motor control system, a reversible rotating field motor having a plurality of windings, an alternating current source, a separate direct current source variable about a predetermined value, an inductance and a capacitance connected in parallel and both connected in series with one of said motor windings across the source of alternating current, means connected to said source of direct current for controlling the value of said inductance, said inductance and capacitance being resonant at the predetermined value of direct current, and connections between the ends of the other of said motor windings and the alternating current source.

2. In a motor control system, a reversible rotating field motor having a plurality of windings, an alternating current source, a separate direct current source variable about a predetermined value, a saturable core reactor including an alternating current winding having inductance and a direct current winding, a capacitance connected in parallel with said alternating current winding and both connected in series with one of the motor windings across the source of alternating current, means for passing current from said direct current source through said direct current winding for controlling the value of the inductance of said alternating current winding, the inductance of said alternating current winding and said capacitance being resonant at the predetermined value of direct current, and connections between the ends of the other of said motor windings and the alternating current source.

3. In a motor control system, a reversible rotating field motor having a plurality of windings, an alternating current source, an original source of current variable about a predetermined value, means including electronic means amplifying said original source of current to produce a direct current variable about a predetermined value in accordance with the variations of said original current source about the predetermined value thereof, an inductance and a capacitance connected in parallel and both connected in series with one of said motor windings across the source of alternating current, means responsive to said direct current for controlling the value of said inductance, said inductance and capacitance being resonant at the predetermined value of said source of direct current, and connections between the ends of the other of said motor windings and the alternating current source.

4. In a motor control system, a reversible rotating field motor having a plurality of windings, an alternating current source, an original source of current variable about a predetermined value, means including electronic means amplifying said original source of current to produce a direct current variable about a predetermined value in accordance with the variations of said original current source about the predetermined value thereof, a saturable core reactor including an alternating current winding having inductance and a direct current winding, a capacitance connected in parallel with said alternating current winding and both connected in series with one of said motor windings across the source of alternating current, means for passing said direct current through said direct current winding for controlling the inductance of said alternating current winding, the inductance of said alternating current winding and said capacitance being resonant at the predetermined value of direct current, and connections between the ends of the other of said motor windings and the alternating current source.

THOMAS R. HARRISON.